United States Patent
Breton et al.

(10) Patent No.: US 8,771,787 B2
(45) Date of Patent: *Jul. 8, 2014

(54) INK FOR DIGITAL OFFSET PRINTING APPLICATIONS

(75) Inventors: Marcel P. Breton, Mississauga (CA); Frank Ping-Hay Lee, Oakville (CA); Aurelian Valeriu Magdalinis, Aurora (CA); Bing R. Hsieh, Pleasanton (CA); Stephan Drappel, Toronto (CA); Timothy D. Stowe, Alameda (CA); C. Geoffrey Allen, Waterdown (CA); Peter Gordon Odell, Mississauga (CA)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/474,138

(22) Filed: May 17, 2012

(65) Prior Publication Data

US 2013/0309397 A1    Nov. 21, 2013

(51) Int. Cl.
*C09D 11/10* (2014.01)
*B05D 5/00* (2006.01)
*C09D 167/07* (2006.01)

(52) U.S. Cl.
USPC .............................. 427/145; 524/539; 522/149

(58) Field of Classification Search
None
See application file for complete search history.

(56) References Cited

U.S. PATENT DOCUMENTS

| | | | | |
|---|---|---|---|---|
| 5,275,646 | A * | 1/1994 | Marshall et al. | 106/31.32 |
| 5,585,201 | A * | 12/1996 | Ha | 428/64.4 |
| 6,593,390 | B1 * | 7/2003 | Johnson et al. | 522/74 |
| 6,803,112 | B1 * | 10/2004 | Chatterjee et al. | 428/458 |
| 7,168,802 | B2 * | 1/2007 | Kondo | 347/100 |
| 8,007,578 | B2 * | 8/2011 | Bhatt | 106/31.9 |
| 2005/0287476 | A1 * | 12/2005 | Ishikawa et al. | 430/281.1 |
| 2008/0258345 | A1 * | 10/2008 | Bens et al. | 264/401 |
| 2008/0308003 | A1 * | 12/2008 | Krol et al. | 106/31.43 |
| 2009/0000508 | A1 * | 1/2009 | Edison et al. | 106/31.6 |
| 2009/0017248 | A1 * | 1/2009 | Larson et al. | 428/41.5 |
| 2009/0035559 | A1 * | 2/2009 | Kitamura et al. | 428/336 |
| 2009/0092922 | A1 * | 4/2009 | Khavari et al. | 430/270.15 |
| 2010/0047457 | A1 * | 2/2010 | Bentley | 427/280 |
| 2011/0298876 | A1 * | 12/2011 | Takeuchi et al. | 347/102 |

* cited by examiner

*Primary Examiner* — Robert S Loewe
(74) *Attorney, Agent, or Firm* — Ronald E. Prass, Jr.; Prass LLP (57) ABSTRACT

An ink composition useful for digital offset printing applications comprises a colorant and a plurality of curable compounds. The compounds have Hansen solubility parameters as described herein, and the resulting ink composition is both compatible with certain dampening fluids and has certain rheological properties, including a low viscosity.

19 Claims, 3 Drawing Sheets

INK FOR DIGITAL OFFSET PRINTING APPLICATIONS

BACKGROUND

The present disclosure relates to certain ink compositions which are compatible with dampening fluids and are useful for variable data lithographic printing. This disclosure also relates to methods of using such ink compositions, such as in variable lithographic printing applications.

Offset lithography is a common method of printing today. (For the purposes hereof, the terms "printing" and "marking" are interchangeable.) In a typical lithographic process a printing plate, which may be a flat plate, the surface of a cylinder, or belt, etc., is formed to have "image regions" formed of a hydrophobic/oleophilic material, and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

BRIEF DESCRIPTION

The present disclosure relates to various ink compositions containing an optional colorant and a plurality of curable compounds. Each curable compound has Hansen solubility parameters as described herein.

Disclosed in embodiments is an ink composition comprising a plurality of curable compounds, wherein the ink composition has a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4.

The plurality of curable compounds may include a tetrafunctional acrylated polyester, a polyethylene glycol diacrylate, or a tripropylene glycol diacrylate.

The ink composition may further comprise from about 0.2 to about 5 wt % of a polyether modified acryl functional polydimethylsiloxane.

In some embodiments, the plurality of curable compounds includes, based on the total weight of the ink composition: from about 40 to about 55 wt % of a tetrafunctional acrylated polyester; from about 9 to about 11 wt % of a polyethylene glycol diacrylate; and from 0 to about 11 wt % of a tripropylene glycol diacrylate.

The ink composition may further comprise from greater than 0 to about 20 wt % of an aliphatic acrylate ester. The ink composition may further comprise at least one additive selected from the group consisting of dispersants, thickening agents, photoinitiators, and stabilizers. In particular embodiments, the ink composition comprises, based on the total weight of the ink composition: from about 2 to about 10 wt % of a dispersant; from about 0.2 to about 5 wt % of a thickening agent; from 0 to about 10 wt % of a photoinitiator; and from about 0.1 to about 1 wt % of a thermal stabilizer.

The ink composition may have a viscosity of from about 5,000 to about 1,000,000 centipoise at 25° C. at a shear rate of 5 sec$^{-1}$. Alternatively, the ink composition may have a shear thinning index (viscosity at 50 sec$^{-1}$/viscosity at 5 sec$^{-1}$) at 25° C. of from about 0.10 to about 0.60. The ink composition could also have a surface tension of from about 25 dynes/cm to about 40 dynes/cm at 25° C.

In some embodiments, the plurality of curable compounds comprises more than 50 wt % of the ink composition.

The ink composition may further comprise a colorant. The ink composition may contain from about 10 to about 40 wt % of the colorant, based on the total weight of the ink composition.

One or more of the curable compounds may be crosslinkable.

Also disclosed in embodiments is a process for variable lithographic printing, comprising: applying a dampening fluid to an imaging member surface; forming a latent image by evaporating the dampening fluid from selective locations on the imaging member surface to form hydrophobic non-image areas and hydrophilic image areas; developing the latent image by applying an ink composition comprising an ink component to the hydrophilic image areas; and transferring the developed latent image to a receiving substrate; wherein the ink composition comprises a plurality of curable compounds, the ink composition having a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4. In some specific embodiments, each curable compound has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4.

The ink composition may contain at least one curable compound which has a radius of interaction greater than 16 with the dampening fluid.

Also disclosed in embodiments is an ink composition comprising a plurality of curable compounds, wherein each curable compound has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

Figure 1:
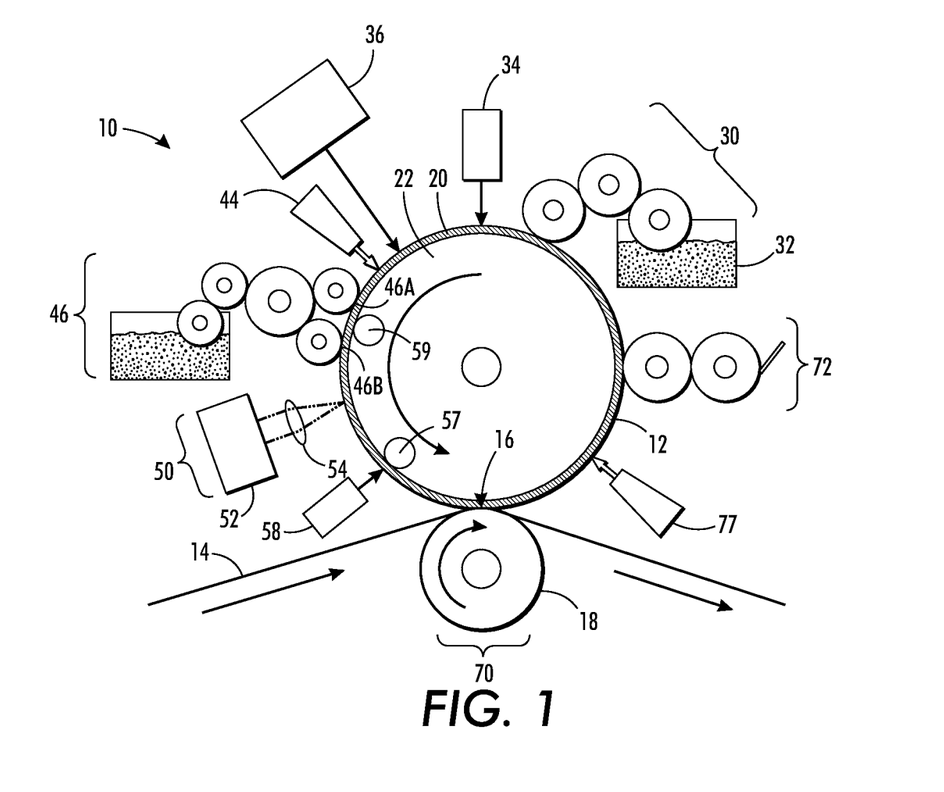
FIG. 1 illustrates a variable lithographic printing apparatus in which the ink compositions of the present disclosure may be used.

The present disclosure relates to ink compositions that are suitable for use in digital offset printing processes. FIG. 1 illustrates a system for variable lithography in which the ink compositions of the present disclosure may be used. The system 10 comprises an imaging member 12. The imaging member comprises a substrate 22 and a reimageable surface layer 20. The surface layer is the outermost layer of the imaging member, i.e. the layer of the imaging member furthest from the substrate. As shown here, the substrate 22 is in the shape of a cylinder; however, the substrate may also be in a belt form, etc. The surface layer 20 is typically a silicone (e.g. a methylsilicone or fluorosilicone), which may have carbon black added to increase energy absorption of the surface layer.

In the depicted embodiment the imaging member 12 rotates counterclockwise and starts with a clean surface. Disposed at a first location is a dampening fluid subsystem 30, which uniformly wets the surface with dampening fluid 32 to form a layer having a uniform and controlled thickness. Ideally the dampening fluid layer is between about 0.05 micrometers and about 1.0 micrometers in thickness, is uniform, and is without pinholes. As explained further below, the composition of the dampening fluid aids in leveling and layer thickness uniformity. A sensor 34, such as an in-situ non-contact laser gloss sensor or laser contrast sensor, is used to confirm the uniformity of the layer. Such a sensor can be used to automate the dampening fluid subsystem 30.

At optical patterning subsystem 36, the dampening fluid layer is exposed to an energy source (e.g. a laser) that selectively applies energy to portions of the layer to image-wise evaporate the dampening fluid and create a latent "negative" of the ink image that is desired to be printed on the receiving substrate. Image areas are created where ink is desired, and non-image areas are created where the dampening fluid remains. An optional air knife 44 is also shown here to control airflow over the surface layer 20 for the purpose of maintaining clean dry air supply, a controlled air temperature, and reducing dust contamination prior to inking. Next, the ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

A rheology control subsystem 50 may be present to partially cure or tack the ink image. This curing source may be, for example, an ultraviolet light emitting diode (UV-LED) 52, which can be focused as desired using optics 54. Another way of increasing the cohesion and viscosity employs cooling of the ink composition. This could be done, for example, by blowing cool air over the reimageable surface from jet 58 after the ink composition has been applied but before the ink composition is transferred to the target substrate. Alternatively, a heating element 59 could be used near the inker subsystem 46 to maintain a first temperature and a cooling element 57 could be used to maintain a cooler second temperature near the nip 16.

The ink image is then transferred to the target or receiving substrate 14 at transfer subsystem 70. This is accomplished by passing a recording medium or receiving substrate 14, such as paper, through the nip 16 between the impression roller 18 and the imaging member 12. The final receiving substrate 14 can be, for example, paper, plastic, or metal.

Finally, the imaging member should be cleaned of any residual ink or dampening fluid. Most of this residue can be easily removed quickly using an air knife 77 with sufficient air flow. Removal of any remaining ink can be accomplished at cleaning subsystem 72.

It should be noted that the apparatus depicted in FIG. 1 transfers the ink directly from the imaging member to the paper, so that the ink must fully release from the imaging member and should enable high quality printing at high speeds. Traditional offset inks are designed to work best with an intermediate transfer member between the imaging member and the final target substrate (i.e. paper). Traditional inks suffer from one or more shortfalls including: solubility in the dampening fluid, swelling of the silicone layer on the imaging member, poor release properties from the imaging member, and limited curing performance. The ink compositions of the present disclosure have certain wetting and release properties that are useful with the imaging member, and the ink compositions are also compatible with non-aqueous dampening fluids.

The ink compositions of the present disclosure comprise a plurality of selected curable compounds and an optional colorant. The curable compounds can be cured under ultraviolet (UV) light to fix the ink in place on the final receiving substrate.

As used herein, the term "colorant" includes pigments, dyes, mixtures of dyes, mixtures of pigments, mixtures of dyes and pigments, and the like. Any dye or pigment may be chosen, provided that it is capable of being dispersed or dissolved in the ink composition and is compatible with the other ink ingredients. The colorant is present in the ink composition in any desired amount, and is typically present in an amount of from about 10 to about 40 weight percent (wt %), based on the total weight of the ink composition. In more specific embodiments, the colorant is present in an amount of from about 15 to about 30 wt %, or from about 19 wt % to about 25 wt %, based on the total weight of the composition. Various pigments and dyes are known in the art, and are commercially available from suppliers such as Clariant, BASF, and Ciba, to name just a few.

The ink composition includes a plurality of curable compounds that have certain Hansen solubility parameters. Hansen solubility parameters were developed to help predict whether one material will dissolve in another and form a homogeneous solution. The parameters can also be used to identify materials that are not compatible and/or have limited solubility in one another.

The Hildebrand total solubility parameter can be divided into three Hansen parameters: a dispersion force parameter; a polar parameter; and a hydrogen bonding parameter. The relationship between the Hildebrand total solubility parameter and the three Hansen solubility parameters is governed by the following equation:

$$\partial_t^2 = \partial_d^2 + \partial_p^2 + \partial_h^2$$

wherein $\partial_t$ is the total solubility parameter; $\partial_d$ is the Hansen dispersion force parameter; $\partial_p$ is the Hansen polar parameter; and $\partial_h$ is the Hansen hydrogen bonding Hansen parameter.

In a triangular Teas graph, the three Hansen solubility parameters are presented in a single chart. To do so, the Hansen solubility parameters must be converted into normalized, i.e. fractional, values according to the following equations in order to be plotted in a single, useful chart:

$$f_d = \frac{\partial_d}{\partial_d + \partial_p + \partial_h}$$

$$f_p = \frac{\partial_p}{\partial_d + \partial_p + \partial_h}$$

$$f_h = \frac{\partial_h}{\partial_d + \partial_p + \partial_h}$$

wherein $f_d$ is the Hansen fractional dispersion force parameter; $f_p$ is the fractional polar parameter; and $f_h$ is the fractional hydrogen bonding parameter. The sum of the three normalized parameters will always be 1.

Each compound in the plurality of curable compounds in the ink compositions of the present disclosure has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4. When the curable ink base composition of the disclosure has a fractional solubility parameters within these ranges, the ink composition has the required wetting and release properties. As explained further herein, it was discovered that compounds within this design space were best suited for use with the non-aqueous dampening fluids that are useful for digital offset lithography. While one or two of the ink components may have properties outside these ranges, it is preferred that the volume average solubility parameter for the ink base (no colorant) be within these ranges.

Suitable curable compounds having the required Hansen fractional parameters include several available from Sartomer.

Sartomer CN294E, which is a tetrafunctional acrylated polyester oligomer. CN294E is a clear liquid having a specific gravity of 0.93 and a viscosity of 4,000 cps at 60° C.

Another example is Sartomer SR-259, which is a polyethylene glycol diacrylate. SR-259 is a clear liquid having a specific gravity of 1.122 at 25° C., a viscosity of 25 cps at 25° C., a surface tension of 41.3 dynes/cm, and a molecular weight of 302 g-mole$^{-1}$.

Another example is Sartomer SR306F, which is a tripropylene glycol diacrylate. SR306F is a clear liquid having a specific gravity of 1.038 at 25° C., a viscosity of 15 cps at 25° C., a surface tension of 33.3 dynes/cm, and a molecular weight of 300 g-mole$^{-1}$.

Another example is Sartomer SR-492 which is a propoxylated trimethylolpropane triacrylate. SR-492 is a clear liquid having a specific gravity of 1.050 at 25° C., a viscosity of 90 cps at 25° C., a surface tension of 34.0 dynes/cm, and a molecular weight of 470 g/mol.

Another example is Sartomer SR454, which is an ethoxylated trimethylolpropane triacrylate. SR454 is a clear liquid having a specific gravity of 1.103 at 25° C., a viscosity of 60 cps at 25° C., a surface tension of 39.6 dynes/cm, and a molecular weight of 428 g/mol.

Another example is Sartomer SR-368D, which is a tris(2-hydroxyethyl)isocyanurate triacrylate. SR-368D is a clear liquid having a specific gravity of 1.158 at 25° C. and a viscosity of 330 cps at 25° C.

Another example is Sartomer SR444, which is a pentaerythritol triacrylate. SR444 is a clear liquid having a specific gravity of 1.162 at 25° C., a viscosity of 520 cps at 25° C., a surface tension of 39.0 dynes/cm, and a molecular weight of 298 g/mol.

Another example is 1,6-hexanediylbis[oxy(2-hydroxy-3,1-propanediyl)]bisacrylate. This compound has a molecular weight of 374.43 g/mol and a density of 0.94 g/mL at 25° C.

Another example is glycerol 1,3-diglycerolate diacrylate. This compound has a molecular weight of 484.54 g/mol and a density of 1.18 g/mL at 25° C.

Three additional curable compounds which may be considered for use in the present disclosure are Sartomer SR-348, SR-349, and CN309. Sartomer SR-348 is an ethoxylated bisphenol A dimethacrylate. SR-348 is a clear liquid having a specific gravity of 1.119 at 25° C., a viscosity of 1082 cps at 25° C., a surface tension of 41.0 dynes/cm, and a molecular weight of 452 g/mol. Sartomer SR-349 is an ethoxylated bisphenol A diacrylate. SR-349 is a clear liquid having a specific gravity of 1.145 at 25° C., a viscosity of 1600 cps at 25° C., a surface tension of 43.6 dynes/cm, and a molecular weight of 468 g/mol. Sartomer CN309 contains an acrylate ester that derives from an aliphatic hydrophobic backbone, or in other words is an aliphatic acrylate ester. CN309 is a clear liquid having a specific gravity of 0.92, a density of 7.68 pounds/gallon, a surface tension of 26.3 dynes/cm, a viscosity of 150 centipoise (cps) at 25° C., and a viscosity of 40 cps at 60° C. This aliphatic acrylate ester may be present in an amount of from 0 to about 20 wt % of the ink composition, including from about 9 to about 12 wt %.

In particular embodiments, each compound in the plurality of curable compounds is an acrylate, or in other words contains at least one acrylate group (—O—CO—C(CH$_3$)=CH$_2$). The carbon-carbon double bond in the acrylate group is available for crosslinking during the curing of the ink composition.

The curable compounds can comprise any suitable curable monomer, oligomer, or prepolymer. Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include, for example, lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include, for example, isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889®) (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The particular monomer, oligomer, prepolymer, etc. is not critical to the embodiments, and may include, for example, one or more of the following: allyl methacrylate; tetrahydrofurfuryl methacrylate; ethylene glycol demethacrylate; 1,3 butylene glycol diacrylate; 1,4 butane diol dimethacrylate; Urethane acrylate blended with tripropylene glycol diacetate; 2-(2-ethoxyethoxy) ethylacrylate; polyethylene glycol (200) diacrylate; pentaerythritol tetraacrylate; tripropylene glycol diacetate; lauryl methacrylate; lauryl acrylate; 2-phenoxyethyl acrylate; polyethylene glycol (400) diacrylate; di-trimethylopropane tetraacrylate; tris-(2hydroxy ethyl) isocyanurate triacrylate; isodecyl acrylate; dipentaerythritol pentaacrylate; ethoxylated (20) trimethylopropane triacrylate; pentaerythritol triacrylate; propoxylated (3) trimethylopropane triacrylate; tridecyl methacrylate; ethoxylated (4) pentaerythritol tetraacrylate; isobornyl acrylate; dipropylene glycol diacrylate; propoxylated neopentyl glycol dicrylate; alkoxylated trifunctional acrylate ester; trifunctional methacrylate ester; trifunctional acrylate ester; pentaacrylate ester, methoxy polyethylene glycol (350) monomethacrylate; alkoxylated cyclohexane dimethanol diacrylate; alkoxylated tetrahydrofurfuryl acrylate; trifunctional acid ester; trifunctional acid ester; tetrafunctional acrylated polyester oligomer; hydrophobic acrylate ester; Urethane acrylate blended with tripropylene glycol diacetate; Urethane acrylate blended with Urethane acrylate blended with tripropylene glycol diacetate; triacrylate urethane acrylate blended with ethoxylated (3) trimethylopropane; triacrylate; urethane acrylate blended with ethoxylated (4) nonyl phenol acrylate; urethane acrylate blended with 1,6-hexanediol diacrylate; urethane acrylate blended with isobornyl acrylate; hexafunctional urethane acrylate; or urethane acrylate.

Other suitable monomers, such as mono-, di-, tri-, or higher-functional monomers, some of which may the same or similar to those described above, may include one or more of the following:

Mono-Functional

| Sartomer Code | Chemical Name |
| --- | --- |
| CD278 | acrylate ester |
| CD420 | acrylic monomer |
| CD421 | 3,3,5 trimethylcyclohexyl methacrylate |
| CD535 | dicyclopentadienyl methacrylate |
| CD545 | diethylene glycol methyl ether methacrylate |
| CD551 | methoxy polyethylene glycol (350) monoacrylate |
| CD552 | methoxy polyethylene glycol (550) monomethacrylate |
| CD553 | methoxy polyethylene glycol (550) monoacrylate |
| CD585 | acrylate ester |
| CD587 | acrylate ester |
| CD588 | acrylate ester |
| CD611 | alkoxylated tetrahydrofurfuryl acrylate |
| CD612 | ethoxylated (4) nonyl phenol methacrylate |
| CD613 | ethoxylated nonyl phenol acrylate |
| CD730 | triethylene glycol ethyl ether methacrylate |

| Sartomer Code | Chemical Name |
| --- | --- |
| CD9050 | monofunctional acid ester |
| CD9075 | alkoxylated lauryl acrylate |
| CD9087 | alkoxylated phenol acrylate |
| CD9088 | alkoxylated phenol acrylate |
| SR203 | tetrahydrofurfuryl methacrylate |
| SR242 | isodecyl methacrylate |
| SR256 | 2(2-ethoxyethoxy) ethyl acrylate |
| SR257 | stearyl acrylate |
| SR285 | tetrahydrofurfuryl acrylate |
| SR313 | lauryl methacrylate |
| SR324 | stearyl methacrylate |
| SR335 | lauryl acrylate |
| SR339 | 2-phenoxylethyl acrylate |
| SR340 | 2-phenoxylethyl methacrylate |
| SR395 | isodecyl acrylate |
| SR423 | isobornyl methacrylate |
| SR440 | isooctyl acrylate |
| SR484 | octadecyl acrylate |
| SR489 | tridecyl acrylate |
| SR493 | tridecyl methacrylate |
| SR495 | caprolactone acrylate |
| SR504 | ethoxylated (4) nonyl phenol acrylate |
| SR506 | isobornyl acrylate |
| SR531 | cyclic trimethylolpropane formal acrylate |
| SR550 | methoxy polyethylene glycol (350) monomethacrylate |
| SR709 | metallic monomethacrylate |

Di-Functional

| Sartomer Code | Chemical Name |
| --- | --- |
| CD262 | 1,12 Dodecandediol Dimethacrylate |
| CD401 | cyclohexane dimethanol dimethacrylate |
| CD406 | cyclohexane dimethanol diacrylate |
| CD536 | acrylate ester |
| CD542 | ethoxylated (8) bisphenol A dimethacrylate |
| CD560 | alkoxylated hexanediol diacrylate |
| CD561 | alkoxylated hexanediol diacrylate |
| CD562 | alkoxylated hexanediol diacrylate |
| CD563 | alkoxylated hexanediol diacrylate |
| CD564 | alkoxylated hexanediol diacrylate |
| CD580 | alkoxylated cyclohexane dimethanol diacrylate |
| CD581 | alkoxylated cyclohexane dimethanol diacrylate |
| CD582 | alkoxylated cyclohexane dimethanol diacrylate |
| CD595 | acrylate ester |
| CD9038 | ethoxylated (30) bisphenol A diacrylate |
| CD9043 | alkoxylated neopentyl glycol diacrylate |
| CD9044 | alkoxylated neopentyl glycol diacrylate |
| SR101 | ethoxylated bisphenol A dimethacrylate |
| SR150 | ethoxylated bisphenol A dimethacrylate |
| SR205 | triethylene glycol dimethacrylate |
| SR206 | ethylene glycol dimethacrylate |
| SR209 | tetraethylene glycol dimethacrylate |
| SR210 | polyethylene glycol dimethacrylate |
| SR212B | 1,3-Butylene Glycol Diacrylate |
| SR213 | 1,4-butanediol diacrylate |
| SR214 | 1,4-butanediol dimethylacrylate |
| SR230 | diethylene glycol diacrylate |
| SR231 | diethylene glycol dimethacrylate |
| SR238 | 1,6-hexanediol diacrylate |
| SR239 | 1,6-hexanediol dimethacrylate |
| SR247 | neopentyl glycol diacrylate |
| SR248 | neopentyl glycol dimethacrylate |
| SR252 | polyethylene glycol (600) dimethacrylate |
| SR259 | polyethylene glycol (200) diacrylate |
| SR268 | tetraethylene glycol diacrylate |
| SR272 | triethylene glycol diacrylate |
| SR297 | 1,3-butylene glycol dimethacrylate |
| SR306 | tripropylene glycol diacrylate |
| SR341 | diacrylate ester |
| SR344 | polyethylene glycol (400) diacrylate |
| SR348 | ethoxylated (2) bisphenol A dimethacrylate |
| SR349 | ethoxylated (3) bisphenol A diacrylate |
| SR480 | ethoxylated (10) bisphenol dimethacrylate |
| SR508 | dipropylene glycol diacrylate |
| SR540 | ethoxylated (4) bisphenol A dimethacrylate |
| SR541 | ethoxylated (6) bisphenol A dimethacrylate |
| SR601 | ethoxylated (4) bisphenol A diacrylate |
| SR602 | ethoxylated (10) bisphenol A diacrylate |
| SR603 | polyethylene glycol (400) dimethacrylate |
| SR610 | polyethylene glycol (600) diacrylate |
| SR644 | polypropylene glycol (400) dimethacrylate |
| SR731 | monomer |
| SR732 | monomer |
| SR740 | polyethylene glycol (1000) dimethacrylate |
| SR833S | tricyclodecane dimethanol diacrylate |
| SR9003 | propoxylated (2) neopentyl glycol diacrylate |
| SR9036 | ethoxylated (30) bisphenol A dimethacrylate |
| SR9045 | alkoxylated neopentyl glycol diacrylate |
| SR9209A | alkoxylated aliphatic diacrylate |

Tri-Functional

| Sartomer Code | Chemical Name |
| --- | --- |
| CD501 | propoxylated (6) trimethylolpropane triacrylate |
| CD9021 | highly propoxylated (5.5) glycol triacrylate |
| CD9051 | trifunctional acid ester |
| SR350 | trimethylolpropane trimethacrylate |
| SR351 | trimethylolpropane triacrylate |
| SR368 | tris (2-hydroxy ethyl) isocyanurate triacrylate |
| SR415 | ethoxylated (20) trimethylolpropane triacrylate |
| SR444 | pentaerythritol triacrylate |
| SR454 | ethoxylated (3) trimethylolpropane triacrylate |
| SR492 | propoxylated (3) trimethylolpropane triacrylate |
| SR499 | ethoxylated (6) trimethylolpropane triacrylate |
| SR502 | ethoxylated (9) trimethylolpropane triacrylate |
| SR9020 | propoxylated (3) glycerol triacrylate |
| SR9035 | ethoxylated (15) trimethylolpropane triacrylate |
| SR9012 | trifunctional actrylate ester |

Higher-Functional

| Sartomer Code | Chemical Name |
| --- | --- |
| SR295 | PENTAERYTHRITOL TETRAACRYLATE |
| SR355 | ditrimethylolpropane tetraacrylate |
| SR399LV | low viscosity dipentaerythritol pentaacrylate |

In particular embodiments, the plurality of curable compounds includes a tetrafunctional acrylated polyester (e.g. CN294E), a polyethylene glycol diacrylate (e.g. SR-259), or a tripropylene glycol diacrylate (e.g. SR306F). The tetrafunctional acrylated polyester may be present in an amount of from 40 to about 55 wt % of the ink composition, including from about 45 to about 50 wt %. The polyethylene glycol diacrylate may be present in an amount of from 9 to about 11 wt % of the ink composition. The tripropylene glycol diacrylate may be present in an amount of from 0 to about 11 wt % of the ink composition, including from about 9 to about 11 wt %. Generally, the plurality of curable compounds makes up from about 40 to about 95 wt % of the ink composition.

In particular embodiments, the plurality of curable compounds includes the tetrafunctional acrylated polyester and the polyethylene glycol diacrylate. Sometimes, the plurality of curable compounds consists of the tetrafunctional acrylated polyester and the polyethylene glycol diacrylate, and optionally the aliphatic acrylate ester and/or the tripropylene glycol diacrylate.

As mentioned above, the ink composition may have a volume average solubility parameter, without colorant, within the recited Hansen ranges as well. Put another way, the ink compositions of the present disclosure may have a volume average Hansen fractional dispersion force parameter ($f_d$) of from about 0.4 to about 0.62, a volume average Hansen fractional polar parameter ($f_p$) of from about 0.1 to about 0.3, and an average Hansen fractional hydrogen bonding parameter ($f_h$) of from about 0.2 to about 0.4. These average fractional parameters can be determined by first calculating the volume fraction of each individual compound in the ink composition, which then enables the calculation of the volume average solubility parameter for each of the individual dispersive, polar and hydrogen bonding contributions to the total solubility parameter of the composition. The fractional components are then calculated from these averages as defined earlier.

Other compounds may also be present in the ink composition and participate in crosslinking, but not have the fractional solubility parameters discussed above, and as a result such compounds should not be considered as being within the plurality of curable compounds. An example of one such compound is a polyether modified acryl functional polydimethylsiloxane, commercially available as BYK 3500, which functions as a leveling agent.

Other additives may also be present in the ink composition, such as one or more dispersants, thickening agents, photoinitiators, and/or thermal stabilizers. An exemplary dispersant is SOLSPERSE 39000, available from Lubrizol. A thickening agent is used to adjust the viscosity of the ink composition. Exemplary thickening agents include CLAYTONE HY, an organo clay available from Southern Clay Products, and silica-type materials such as AEROSIL 200 from Degussa. Exemplary photoinitiators include IRGACURE 184 and IRGACURE 819, both available from Ciba Specialty Chemicals. IRGACURE 184 is 1-hydroxy-cyclohexyl-phenyl-ketone, having a molecular weight of 204.3. IRGACURE 819 is bis(2,4,6-trimethylbenzoyl)-phenylphosphine oxide, having a molecular weight of 418.5. An exemplary thermal stabilizer is IRGASTAB UV 10, available from Ciba Specialty Chemicals, which acts as a radical scavenger to prevent thermal curing of UV curable components. The dispersant(s) may be present in an amount of from about 2 to about 10 wt % of the ink composition, or from about 3 wt % to about 7 wt %, or from about 5 wt %. The thickening agent(s) may be present in an amount of from about 0.2 to about 5 wt % of the ink composition. The photoinitiator(s) may be present in an amount of from 0 to about 10 wt % of the ink composition, including from about 0.5 to about 10 wt %. The thermal stabilizer(s) may be present in an amount of from about 0.1 to about 1 wt % of the ink composition.

The resulting ink compositions of the present disclosure may have a viscosity of from about 5,000 to about 1,000,000 centipoise at 25° C. and a shear rate of 5 sec$^{-1}$, including a viscosity of from about 5,000 to about 300,000 centipoise, or from about 15,000 to about 250,000 cps, or from about 5,000 cps to about 75,000 cps, or from about 30,000 cps to about 60,000 cps.

The resulting ink compositions of the present disclosure may have a viscosity of from about 2,000 to about 90,000 centipoise at 25° C. and a shear rate of 50 sec$^{-1}$, including a viscosity of from about 5,000 to about 65,000 cps.

The shear thinning index, or SHI, is defined in the present disclosure as the ratio of the viscosity of the ink composition at two different shear rates, here 50 sec$^{-1}$ and 5 sec$^{-1}$. This may be abbreviated as SHI (50/5). The SHI (50/5) may be from about 0.10 to about 0.60 for the ink compositions of the present disclosure, including from about 0.35 to about 0.55.

The ink compositions of the present disclosure may also have a surface tension of at least about 25 dynes/cm at 25° C., including from about 25 dynes/cm to about 40 dynes/cm at 25° C.

The ink compositions of the present disclosure possess many desirable physical and chemical properties. They are compatible with the materials with which they will come into contact, such as the dampening fluid, the surface layer of the imaging member, and the final receiving substrate. They also have the required wetting and transfer properties. They can be UV-cured and fixed in place. They also meet the demanding rheological requirements of the variable lithographic printing apparatus for which the inks of the present disclosure are intended for use. In addition, one of the most difficult issues to overcome is the need for cleaning and waste handling between successive digital images to allow for digital imaging without ghosting of previous images. The inks of the present disclosure are designed to enable very high transfer efficiency, thus overcoming many of the problems associated with cleaning and waste handling. The ink compositions do not gel, can contain a high pigment load, and may have a high viscosity suitable for digital offset printing.

The ink compositions of the present disclosure can be made according to the methods disclosed in U.S. patent application Ser. No. 13/474,185, filed concurrently and entitled "Methods For Manufacturing Curable Inks For Digital Offset Printing Applications And The Inks Made Therefrom", and fully incorporated by reference herein. Generally, the methods include: a) adding to a mixing vessel at least one monomer or oligomer and at least one dispersant; b) heating the mixing vessel; c) adding at least an initiator or a curing agent and a thermal stabilizer while mixing; d) slowly adding at least one pigment while stirring to form a pigmented radiation curable ink composition; e) cooling the pigmented radiation curable ink composition to about room temperature; and f) milling the pigmented radiation curable ink composition to reduce the particle size of the composition to less than about 1 μm to prepare a pigmented, curable, ink composition.

The present disclosure contemplates a printing system where the dampening fluid is hydrophobic and the ink composition is somewhat hydrophilic (having a small polar component). This system can be used with an imaging member surface which has low surface energy which is mainly dispersive in character. Thus it can work with an imaging member that is a silicone, fluorosilicone, or Viton® based elastomer, which offers high temperature wear robustness to the laser energy used in variable lithographic printing.

By choosing the proper chemistry, it is possible to devise a system where both the ink and the dampening fluid will wet the imaging member surface, but the ink and the dampening fluid will not mutually wet each other. The system can also be designed so that it is energetically favorable for dampening fluid in the presence of ink residue to actually lift the ink residue off of the imaging member surface by having a higher affinity for wetting the surface in the presence of the ink. In other words, the dampening fluid could remove microscopic background defects (e.g. <1 μm radius) from propagating in subsequent prints.

The dampening fluid should have a slight positive spreading coefficient so that the dampening fluid wets the imaging member surface. The dampening fluid should also maintain a spreading coefficient in the presence of ink, or in other words the dampening fluid has a closer surface energy value to the imaging member surface than the ink does. This causes the imaging member surface to value wetting by the dampening fluid compared to the ink, and permits the dampening fluid to lift off any ink residue and reject ink from adhering to the surface where the laser has not removed dampening fluid. Next, the ink should wet the imaging member surface in air with a roughness enhancement factor (i.e. when no dampening fluid is present on the surface). It should be noted that the surface may have a roughness of less than 1 μm when the ink is applied at a thickness of 1 to 2 μm. Desirably, the dampening fluid does not wet the ink in the presence of air. In other words, fracture at the exit inking nip should occur where the ink and the dampening fluid interface, not within the dampening fluid itself. This way, dampening fluid will not tend to remain on the imaging member surface after ink has been transferred to a receiving substrate. Finally, it is also desirable that the ink and dampening fluid are chemically immiscible such that only emulsified mixtures can exist. Though the ink and the dampening fluid may have alpha-beta coordinates close together, often choosing the chemistry components with different levels of hydrogen bonding can reduce miscibility by increasing the difference in the Hanson solubility parameters.

The role of the dampening fluid is to provide selectivity in the imaging and transfer of ink to the receiving substrate. When an ink donor roll in the ink source of FIG. 1 contacts the dampening fluid layer, ink is only applied to areas on the imaging member that are dry, i.e. not covered with dampening fluid.

In this regard, a material is typically soluble in a solvent if the solvent lies within the solubility sphere of the material. Whether a solvent lies within the solubility sphere of the material may be determined by calculating whether the distance of the solvent from the center of the material's solubility sphere is less than the radius of interaction for the material according to the following equation (1):

$$R_{(S-P)} = \sqrt{4(\partial_d s - \partial_d m)^2 + (\partial_p s - \partial_p m)^2 + (\partial_h s - \partial_h m)^2} \quad (1)$$

wherein $R_{(S-P)}$ is the distance between the solvent and the center of the material solubility sphere (i.e. the radius); $\partial_x s$ is the Hansen component for the solvent; and $\partial_x m$ is the Hansen component for the material. R is also referred to as the radius of interactions.

In the present disclosure, the dampening fluid corresponds to the solvent of equation (1), and the ink composition corresponds to the material of equation (1). Desirably, the ink composition is insoluble in the dampening fluid, so it is preferable that the radius of interactions be as large as possible.

In embodiments, the ink composition contains at least one curable compound which has a radius of interaction greater than 16 with the dampening fluid. In more specific embodiments, the radius of interaction is 18 or greater, or 20 or greater.

It is contemplated that the dampening fluid which is compatible with the ink compositions of the present disclosure is a volatile hydrofluoroether (HFE) liquid or a volatile silicone liquid. These classes of fluids provides advantages in the amount of energy needed to evaporate, desirable characteristics in the dispersive/polar surface tension design space, and the additional benefit of zero residue left behind once evaporated. The hydrofluoroether and silicone are liquids at room temperature, i.e. 25° C.

In specific embodiments, the volatile hydrofluoroether liquid has the structure of Formula (I):

Formula (I)

wherein m and n are independently integers from 1 to about 9; and p and q are independently integers from 0 to 19. As can be seen, generally the two groups bound to the oxygen atom are fluoroalkyl groups.

In particular embodiments, q is zero and p is non-zero. In these embodiments, the right-hand side of the compound of Formula (I) becomes a perfluoroalkyl group. In other embodiments, q is zero and p has a value of 2 m+1. In these embodiments, the right-hand side of the compound of Formula (I) is a perfluoroalkyl group and the left-hand side of the compound of Formula (I) is an alkyl group. In still other embodiments, both p and q are at least 1.

In this regard, the term "fluoroalkyl" as used herein refers to a radical which is composed entirely of carbon atoms and hydrogen atoms, in which one or more hydrogen atoms may be (i.e. are not necessarily) substituted with a fluorine atom, and which is fully saturated. The fluoroalkyl radical may be linear, branched, or cyclic.

The term "alkyl" as used herein refers to a radical which is composed entirely of carbon atoms and hydrogen atoms which is fully saturated and of the formula —$C_nH_{2n+1}$. The alkyl radical may be linear, branched, or cyclic. It should be noted that an alkyl group is a subset of fluoroalkyl groups.

The term "perfluoroalkyl" as used herein refers to a radical which is composed entirely of carbon atoms and fluorine atoms which is fully saturated and of the formula —$C_nF_{2n+1}$. The perfluoroalkyl radical may be linear, branched, or cyclic. It should be noted that a perfluoroalkyl group is a subset of fluoroalkyl groups, and cannot be considered an alkyl group.

In particular embodiments, the hydrofluoroether has the structure of any one of Formulas (I-a) through (I-h):

Formula (I-a)

(Formula (I-b))

Formula (I-c)

(Formula (I-d))

Formula (I-e)

(Formula (I-f))

Formula (I-g)

Formula (I-h)

Of these formulas, Formulas (I-a), (I-b), (I-d), (I-e), (I-f), (I-g), and (I-h) have one alkyl group and one perfluoroalkyl group, either branched or linear. In some terminology, they are also called segregated hydrofluoroethers. Formula (I-c) contains two fluoroalkyl groups and is not considered a segregated hydrofluoroether.

Formula (I-a) is also known as 1,1,1,2,2,3,4,5,5,5-decafluoro-3-methoxy-4-(trifluoromethyl)pentane and has CAS #132182-92-4. It is commercially available as Novec™ 7300.

Formula (I-b) is also known as 3-ethoxy-1,1,1,2,3,4,4,5,5,6,6,6-dodecafluoro-2-(trifluoromethyl)hexane and has CAS #297730-93-9. It is commercially available as Novec™ 7500.

Formula (I-c) is also known as 1,1,1,2,3,3-Hexafluoro-4-(1,1,2,3,3,3-hexafluoropropoxy)pentane and has CAS #870778-34-0. It is commercially available as Novec™ 7600.

Formula (I-d) is also known as methyl nonafluoroisobutyl ether and has CAS #163702-08-7. Formula (I-e) is also known as methyl nonafluorobutyl ether and has CAS #163702-07-6. A mixture of Formulas (I-d) and (I-e) is commercially available as Novec™ 7100. These two isomers are inseparable and have essentially identical properties.

Formula (I-f) is also known as 1-methoxyheptafluoropropane or methyl perfluoropropyl ether, and has CAS #375-03-1. It is commercially available as Novec™ 7000.

Formula (I-g) is also known as ethyl nonafluoroisobutyl ether and has CAS #163702-05-4. Formula (I-h) is also known as ethyl nonafluorobutyl ether and has CAS #163702-06-5. A mixture of Formulas (I-g) and (I-h) is commercially available as Novec™ 7200 or Novec™ 8200. These two isomers are inseparable and have essentially identical properties.

It is also possible that similar compounds having a cyclic aromatic backbone with perfluoroalkyl sidechains can be used. In particular, compounds of Formula (A) are contemplated:

Ar—($C_kF_{2k+1}$)$_t$     Formula (A)

wherein Ar is an aryl or heteroaryl group; k is an integer from 1 to about 9; and t indicates the number of perfluoroalkyl sidechains, t being from 1 to about 8.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms).

The term "heteroaryl" refers to a cyclic radical composed of carbon atoms, hydrogen atoms, and a heteroatom within a ring of the radical, the cyclic radical being aromatic. The heteroatom may be nitrogen, sulfur, or oxygen. Exemplary heteroaryl groups include thienyl, pyridinyl, and quinolinyl. When heteroaryl is described in connection with a numerical range of carbon atoms, it should not be construed as including substituted heteroaromatic radicals. Note that heteroaryl groups are not a subset of aryl groups.

Hexafluoro-m-xylene (HFMX) and hexafluoro-p-xylene (HFPX) are specifically contemplated as being useful compounds of Formula (A) that can be used as low-cost dampening fluids. HFMX and HFPX are illustrated below as Formulas (A-a) and (A-b):

Formula (A-a)

Formula (A-b)

It should be noted any co-solvent combination of fluorinated damping fluids can be used to help suppress non-desirable characteristics such as a low flammability temperature.

Alternatively, the dampening fluid solvent is a volatile silicone liquid. In some embodiments, the volatile silicone liquid is a linear siloxane having the structure of Formula (II):

Formula (II)

wherein $R_a$, $R_b$, $R_c$, $R_d$, $R_e$, and $R_f$ are each independently hydrogen, alkyl, or perfluoroalkyl; and a is an integer from 1 to about 5. In some specific embodiments, $R_a$, $R_b$, $R_c$, $R_d$, $R_e$, and $R_f$ are all alkyl. In more specific embodiments, they are all alkyl of the same length (i.e. same number of carbon atoms).

Exemplary compounds of Formula (II) include hexamethyldisiloxane and octamethyltrisiloxane, which are illustrated below as Formulas (II-a) and (II-b):

Formula (II-a)

Formula (II-b)

In other embodiments, the volatile silicone liquid is a cyclosiloxane having the structure of Formula (III):

Formula (III)

wherein each $R_g$ and $R_h$ is independently hydrogen, alkyl, or perfluoroalkyl; and b is an integer from 3 to about 8. In some specific embodiments, all of the $R_g$ and $R_h$ groups are alkyl. In more specific embodiments, they are all alkyl of the same length (i.e. same number of carbon atoms).

Exemplary compounds of Formula (III) include octamethylcyclotetrasiloxane (aka D4) and decamethylcyclopentasiloxane (aka D5), which are illustrated below as Formulas (III-a) and (III-b):

Formula (III-a)

Formula (III-b)

In other embodiments, the volatile silicone liquid is a branched siloxane having the structure of Formula (IV):

Formula (IV)

wherein $R_1$, $R_2$, $R_3$, and $R_4$ are independently alkyl or —$OSiR_1R_2R_3$.

An exemplary compound of Formula (IV) is methyl trimethicone, also known as methyltris(trimethylsiloxy)silane, which is commercially available as TMF-1.5 from Shin-Etsu, and shown below with the structure of Formula (IV-a):

Formula (IV-a)

Any of the above described hydrofluoroethers/perfluorinated compounds are miscible with each other. Any of the above described silicones are also miscible with each other. This allows for the tuning of the dampening fluid for optimal print performance or other characteristics, such as boiling point or flammability temperature. Combinations of these hydrofluoroether and silicone liquids are specifically contemplated as being within the scope of the present disclosure. It should also be noted that the silicones of Formulas (II), (III), and (IV) are not considered to be polymers, but rather discrete compounds whose exact formula can be known.

In particular embodiments, it is contemplated that the dampening fluid comprises a mixture of octamethylcyclotetrasiloxane (D4) and decamethylcyclopentasiloxane (D5). Most silicones are derived from D4 and D5, which are produced by the hydrolysis of the chlorosilanes produced in the Rochow process. The ratio of D4 to D5 that is distilled from the hydrolysate reaction is generally about 85% D4 to 15% D5 by weight, and this combination is an azeotrope.

In particular embodiments, it is contemplated that the dampening fluid comprises a mixture of octamethylcyclotetrasiloxane (D4) and hexamethylcyclotrisiloxane (D3), the D3 being present in an amount of up to 30% by total weight of the D3 and the D4. The effect of this mixture is to lower the effective boiling point for a thin layer of dampening fluid.

The volatile hydrofluoroether liquids and volatile silicone liquids of the present disclosure have a low heat of vaporization, low surface tension, and good kinematic viscosity.

Aspects of the present disclosure may be further understood by referring to the following examples. The examples are illustrative, and are not intended to be limiting embodiments thereof.

EXAMPLES

A description of the materials used in the examples is provided here in Table 1.

TABLE 1

| Material | Description | Supplier |
|---|---|---|
| Irgalite Blue GLO | Pigment | Ciba |
| CN309 | Oligomeric acrylate ester derived from an aliphatic hydrophobic backbone | Sartomer |
| CN293 | Hexafunctional acrylated polyester oligomer | Sartomer |
| CN294E | Tetrafunctional acrylated polyester oligomer | Sartomer |
| SR259 | Polyethylene glycol (200) diacrylate monomer | Sartomer |
| Solsperse 39000 | Polymeric dispersant | Lubrizol |
| Claytone HY | Rheological additive | Southern Clay |
| Irgacure 184 | Photoinitiator | Ciba |
| Irgacure 819 | Photoinitiator | Ciba |
| Irgastab UV10 | Stabilizer | Ciba |
| BYK 3500 | Surface additive | BYK |
| SR306F | Tripropylene glycol diacrylate monomer | Sartomer |

Initially, the Hildebrand solubility parameter approach was used to identify curable monomers and oligomers that were most likely to be compatible with the digital offset printing systems contemplated herein. Screening of suitable ink ingredients was also conducted by measuring the degree of mixability between the ink ingredient and the dampening fluid. NOVEC 7600 was used in the dampening fluid. Other screening criteria included curability, surface tension, viscosity, and safety.

Ninety-nine different monomers and oligomers (i.e possible ink ingredients) were tested and ranked according to the following experimental procedure. Roughly equal amounts (0.5 to 1 mL each) of the monomer/oligomer and Novec™ 7600 were pipetted into a 4 mL vial. The vial was shaken vigorously by hand. Mixability was then visually measured on a scale of 0 to 3. 0 indicated that the materials were not mixable and exhibited rapid phase separation. 1 indicated that the materials exhibited slow phase separation. 2 indicated that the materials formed a cloudy solution without phase separation. 2.5 indicated that the materials formed a clear solution but showed some signs of phase separation over time. 3 indicated that the materials formed a mixable, clear solution. Low mixability was more desirable, as this indicated that the possible ink ingredient might be suitable for inclusion in the ink composition.

Next, the radius of interaction was calculated for nine possible ink ingredients with Novec™ 7600. The mixability was plotted as a function of the radius of interaction for each ingredient. Mixability may be minimized by selecting curable ingredients (or mixtures) that have low mixability or a radius of interaction greater than 16. Ingredients meeting this criteria included Sartomer SR348 and SR349.

Figure 2:
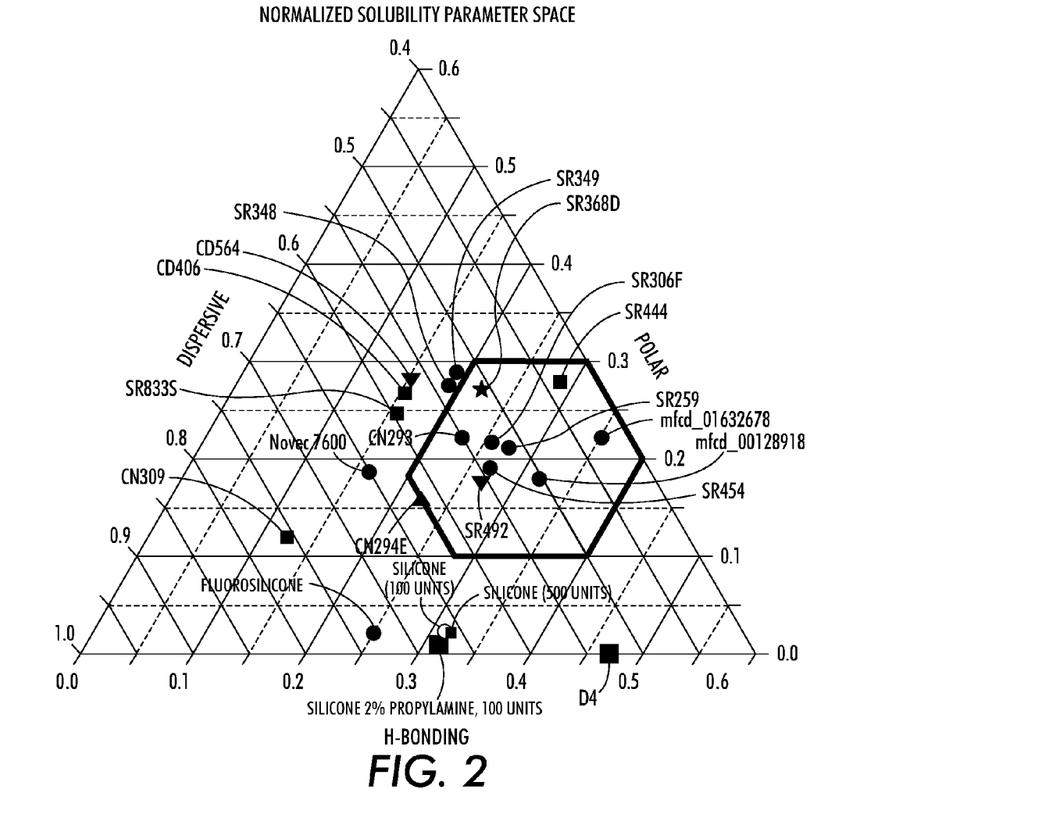
FIG. 2 is a Teas plot showing the Hansen solubility parameters for various curable compounds that can be used in the ink compositions.

Next, a Teas plot of the various ink ingredients and dampening fluids was produced, as shown in FIG. 2 using the Hansen fractional parameters. Some silicones are also shown to indicate the space occupied by materials that are models for the imaging plate used in the imaging system. Unexpectedly, it was found that the ink ingredients that were immiscible with NOVEC 7600 fell within narrow ranges for each fractional solubility parameter. In particular, the optimal range for the fractional dispersion component ($f_d$) was found to be from about 0.4 to about 0.6. The optimal range for the fractional polar component ($f_p$) was found to be from about 0.1 to about 0.3. Lastly, the optimal range for the fractional hydrogen-bonding component ($f_h$) was found to be from about 0.2 to about 0.4. Suitable ink ingredients meeting these parameters included Sartomer CN309, CN294E, SR-259, SR306F, SR-492, SR-368D, SR-348, and SR-349.

The Hansen fractional parameters for various materials are listed in Table 2:

TABLE 2

| Material | $f_H$ | $f_P$ | $f_D$ |
|---|---|---|---|
| Novec 7600 | 0.16079 | 0.18967 | 0.64954 |
| D4 | 0.47027 | 0 | 0.52973 |
| Silicone (500 units) | 0.3134 | 0.00974 | 0.67686 |
| Silicone (100 units) | 0.31468 | 0.02174 | 0.66358 |
| Silicone 2% propylamine, 100 units | 0.31654 | 0.02177 | 0.6617 |
| SR454 | 0.2668 | 0.19376 | 0.53944 |
| SR306F | 0.2571 | 0.21932 | 0.52359 |
| SR259 | 0.27272 | 0.21538 | 0.5119 |
| mfcd_00128918[1] | 0.31684 | 0.18146 | 0.5017 |
| mfcd_01632678[2] | 0.35177 | 0.2246 | 0.42363 |
| SR349 | 0.18876 | 0.28947 | 0.52177 |
| SR348 | 0.18845 | 0.27743 | 0.53412 |
| CD564 | 0.14996 | 0.2844 | 0.56564 |
| SR492 | 0.26515 | 0.18162 | 0.55323 |
| SR368D | 0.21991 | 0.27371 | 0.50638 |
| CM309 | 0.12258 | 0.12211 | 0.75531 |

TABLE 2-continued

| Material | $f_H$ | $f_P$ | $f_D$ |
|---|---|---|---|
| CN293 | 0.2264 | 0.22566 | 0.54794 |
| CN294E | 0.22258 | 0.15992 | 0.61751 |
| Fluorosilicone | 0.25008 | 0.02135 | 0.72857 |
| SR833S | 0.157 | 0.25008 | 0.59291 |
| SR444 | 0.2856 | 0.28171 | 0.43269 |
| CD406 | 0.1529 | 0.26956 | 0.57754 |

[1] 1,6-Hexanediylbis[oxy(2-hydroxy-3,1-propanediyl)] bisacrylate
[2] Glycerol 1,3-diglycerolate diacrylate Next, a number of different UV curable ink compositions were formulated. The amounts for each ingredient and properties of the exemplary compositions are listed below in Tables 3A and 3B.

TABLE 3A

| Chemical | C6 wt % | C7 wt % | C8 wt % | C9B wt % |
|---|---|---|---|---|
| Ciba Irgalite Blue GOL | 24 | 21.62 | 24 | 17 |
| Sartomer CN309 | 10.5 | 9.46 | 18.56 | 10.2 |
| Sartomer CN293 | 0 | 0 | 0 | 0 |
| Sartomer CN294e | 51.3 | 46.22 | 42.24 | 49.8 |
| Sartomer SR259 | 0 | 9.01 | 0 | 9.75 |
| Solsperse 39000 | 6 | 5.41 | 6 | 4.25 |
| Southern Clay HY | 2 | 1.8 | 2 | 1.8 |
| Irgacure 184 | 3.5 | 3.15 | 3.5 | 3.5 |
| Irgacure 819 | 2.5 | 2.25 | 2.5 | 2.5 |
| Ciba Irgastab UV10 | .2 | 0.18 | 0.2 | 0.2 |
| BYK 3500 | 0 | 0.9 | 1 | 1 |
| SR306F | 0 | 0 | 0 | 0 |
| Viscosity in cPs (5 sec$^{-1}$) | 141,900 | 64.525 | 96,200 | 32,505 |
| Viscosity in cPs (50 sec$^{-1}$) | 87,900 | 24.991 | 41,100 | 14,916 |
| SHI (50/5) | 0.62 | 0.39 | 0.43 | 0.46 |

TABLE 3B

| Chemical | C10B wt % | C11B wt % | C9A wt % | C10A wt % | C11A wt % |
|---|---|---|---|---|---|
| Ciba Irgalite Blue GOL | 20 | 20 | 17 | 20 | 20 |
| Sartomer CN309 | 9.65 | 0 | 11.08 | 10.53 | 0 |
| Sartomer CN293 | 0 | 0 | 0 | 0 | 0 |
| Sartomer CN294e | 47.12 | 47.12 | 54.08 | 51.4 | 51.4 |
| Sartomer SR259 | 9.23 | 9.23 | 10.59 | 10.07 | 10.07 |
| Solsperse 39000 | 5 | 5 | 4.25 | 5 | 5 |
| Southern Clay HY | 1.8 | 1.8 | 1.8 | 1.8 | 1.8 |
| Irgacure 184 | 3.5 | 3.5 | 0 | 0 | 0 |
| Irgacure 819 | 2.5 | 2.5 | 0 | 0 | 0 |
| Ciba Irgastab UV10 | 0.2 | 0.2 | 0.2 | 0.2 | 0.2 |
| BYK 3500 | 1 | 1 | 1 | 1 | 1 |

TABLE 3B-continued

| Chemical | C10B wt % | C11B wt % | C9A wt % | C10A wt % | C11A wt % |
|---|---|---|---|---|---|
| SR306F | 0 | 9.65 | 0 | 0 | 10.53 |
| Viscosity in cPs (5 sec$^{-1}$) | 47,674 | 34,450 | 32,505 | 42,827 | 26,773 |
| Viscosity in cPs (50 sec$^{-1}$) | 19,209 | 34,450 | 32,505 | 42,827 | 26,773 |
| SHI (50/5) | 0.4 | 0.39 | 0.51 | 0.44 | 0.4 |

Figure 3:
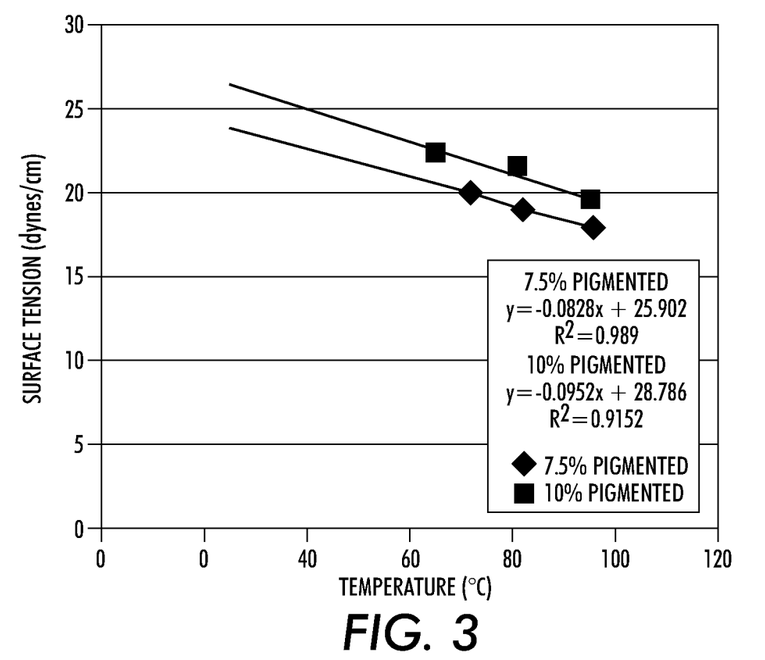
FIG. 3 is a graph showing surface tension data for ink compositions with different pigment loadings.

Rheological data was obtained for the above-described ink compositions using a 25 mm parallel plate and an ARES G2 controlled strain rheometer with a Peltier temperature control system for rapid heating/cooling. Surface tension of offset inks is difficult to measure at room temperature due to extremely high viscosity. Surface tension was measured using the Wilhelmy plate method with a Kruss K-100 Tensiometer. FIG. 3 shows the results for dilute cyan offset ink with SR259 at 7.5% pigment loading and 10 wt % pigment loading. Surface tension was measured at various temperatures. Data was collected from 0.1 to 120 seconds using logarithmic decade data sampling. The average of the last points taken is shown in FIG. 3. Using these measurements, extrapolation of surface tension at 25° C. and 21.6 wt % pigment in offset ink resulted in a surface tension of from 30 dynes/cm to 38 dynes/cm.

The curable inks of the present disclosure were imaged on a test fixture. Improved imaging performance was observed, particularly for the inks of lower viscosity, typically less than about 50,000 cPs at 50 sec$^{-1}$, and for the inks that were formulated from the concentrates above by adding additional low viscosity monomers. The shear thinning index (SHI) may be adjusted to improve performance.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An ink composition comprising a plurality of curable compounds, wherein the ink composition has a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4, wherein the plurality of curable compounds includes a tetrafunctional acrylated polyester.

2. The ink composition of claim 1, wherein the plurality of curable compounds includes a polyethylene glycol diacrylate.

3. The ink composition of claim 1, wherein the plurality of curable compounds includes a tripropylene glycol diacrylate.

4. The ink composition of claim 1, further comprising from about 0.2 to about 5 wt % of a polyether modified acryl functional polydimethylsiloxane.

5. The ink composition of claim 1, wherein the plurality of curable compounds includes, based on the total weight of the ink composition:
from about 40 to about 55 wt % of a tetrafunctional acrylated polyester;
from about 9 to about 11 wt % of a polyethylene glycol diacrylate; and
from 0 to about 11 wt % of a tripropylene glycol diacrylate.

6. The ink composition of claim 1, further comprising from greater than 0 to about 20 wt % of an aliphatic acrylate ester.

7. The ink composition of claim 1, further comprising at least one additive selected from the group consisting of dispersants, thickening agents, photoinitiators, and stabilizers.

8. The ink composition of claim 1, further comprising, based on the total weight of the ink composition:
from about 2 to about 10 wt % of a dispersant;
from about 0.2 to about 5 wt % of a thickening agent;
from 0 to about 10 wt % of a photoinitiator; and
from about 0.1 to about 1 wt % of a thermal stabilizer.

9. The ink composition of claim 1, wherein the ink composition has a viscosity of from about 5,000 to about 1,000,000 centipoise at 25° C. and a shear rate of 5 sec$^{-1}$.

10. The ink composition of claim 1, wherein the ink composition has a shear thinning index (50/5) at 25° C. of from about 0.10 to about 0.60.

11. The ink composition of claim 1, wherein the ink composition has a surface tension of from about 25 dynes/cm to about 40 dynes/cm at 25° C.

12. The ink composition of claim 1, wherein the plurality of curable compounds comprises more than 50 wt % of the ink composition.

13. The ink composition of claim 1, further comprising a colorant.

14. The ink composition of claim 13, containing from about 10 to about 40 wt % of the colorant, based on the total weight of the ink composition.

15. The ink composition of claim 1, wherein one or more of the curable compounds are crosslinkable.

16. A process for variable lithographic printing, comprising:
applying a dampening fluid to an imaging member surface;
forming a latent image by evaporating the dampening fluid from selective locations on the imaging member surface to form hydrophobic non-image areas and hydrophilic image areas;
developing the latent image by applying an ink composition comprising an ink component to the hydrophilic image areas; and
transferring the developed latent image to a receiving substrate;
wherein the ink composition comprises a plurality of curable compounds, the ink composition having a volume average Hansen fractional dispersion force parameter ($f_d$) of from about 0.4 to about 0.62, a volume average Hansen fractional polar parameter ($f_p$) of from about 0.1 to about 0.3, and a volume average Hansen fractional hydrogen bonding parameter ($f_h$) of from about 0.2 to about 0.4, wherein the plurality of curable compounds includes a tetrafunctional acrylated polyester.

17. The process of claim 16, wherein the ink composition contains at least one curable compound which has a radius of interaction greater than 16 with the dampening fluid.

18. The process of claim 16, wherein one or more of the curable compounds are crosslinkable.

19. An ink composition comprising a plurality of curable compounds, wherein each curable compound has a Hansen fractional dispersion force parameter ($f_d$) of from about 0.4 to about 0.62, a Hansen fractional polar parameter ($f_p$) of from about 0.1 to about 0.3, and a Hansen fractional hydrogen bonding parameter ($f_h$) of from about 0.2 to about 0.4, wherein the plurality of curable compounds includes a tetrafunctional acrylated polyester.

* * * * *